(12) United States Patent
Burdett et al.

(10) Patent No.: US 7,711,515 B2
(45) Date of Patent: May 4, 2010

(54) SYSTEM AND METHOD FOR AUTOMATED PARAMETER MEASUREMENT

(75) Inventors: Michael P. Burdett, Tucson, AZ (US); Daniel Reich, Tucson, AZ (US); Stolyarov Yury Sergeyevich, Reutov (RU)

(73) Assignee: Current Energy Controls, LP, Tucson, AZ (US)

( * ) Notice: Subject to any disclaimer, the term of this patent is extended or adjusted under 35 U.S.C. 154(b) by 19 days.

(21) Appl. No.: 11/872,756

(22) Filed: Oct. 16, 2007

(65) Prior Publication Data

US 2008/0103723 A1 May 1, 2008

Related U.S. Application Data

(60) Provisional application No. 60/854,160, filed on Oct. 26, 2006.

(51) Int. Cl.
*G01K 17/00* (2006.01)
*G08B 17/00* (2006.01)

(52) U.S. Cl. ........................... 702/136; 340/584

(58) Field of Classification Search .......... 702/136, 702/57, 131, 188, 189, 81, 84, 127, 130, 702/132, 179, 182, 183; 700/109, 114–116, 700/108; 340/3.1, 3.5, 286.09, 870.05, 870.16, 340/870.17, 572.4, 584, 825.49, 825.69, 340/825.72; 374/100, 116, 102, 107, 108, 374/111, 112, 124, 132, 137; 705/15

See application file for complete search history.

(56) References Cited

U.S. PATENT DOCUMENTS

| | | | | |
|---|---|---|---|---|
| 5,798,694 A | * | 8/1998 | Reber et al. | 340/540 |
| 6,046,674 A | * | 4/2000 | Irwin et al. | 340/539.28 |
| 6,453,687 B2 | * | 9/2002 | Sharood et al. | 62/127 |
| 6,798,219 B2 | * | 9/2004 | Lamothe | 324/685 |
| 6,806,808 B1 | * | 10/2004 | Watters et al. | 340/10.41 |
| 6,829,520 B1 | * | 12/2004 | Green | 700/225 |
| 6,865,516 B1 | * | 3/2005 | Richardson | 702/188 |
| 6,970,100 B2 | * | 11/2005 | Lovegreen et al. | 340/870.17 |
| 7,013,661 B2 | * | 3/2006 | Gatling et al. | 62/228.3 |
| 7,165,015 B2 | * | 1/2007 | Roberts | 702/188 |
| 7,327,260 B2 | * | 2/2008 | Himberger et al. | 340/572.1 |
| 7,372,003 B2 | * | 5/2008 | Kates | 219/494 |
| 2003/0214999 A1 | | 11/2003 | Chapman et al. | 374/170 |
| 2007/0067118 A1 | | 3/2007 | Cooper | 702/57 |
| 2008/0120188 A1 | * | 5/2008 | Mobley et al. | 705/15 |

OTHER PUBLICATIONS

Kuchta et al., Wireless Temperature Data Logger, 2005 IEEE, pp. 208-212.*
Huang et al., Mobile Diagnosis Based on RFID for Food Safety, Oct. 7-10, 2006, Proceeding of the 2006 IEEE, International Conference on Automation Science and Engineering, pp. 357-362.*

* cited by examiner

*Primary Examiner*—Michael P. Nghiem
*Assistant Examiner*—Toan M Le
(74) *Attorney, Agent, or Firm*—Baker Botts L.L.P.

(57) ABSTRACT

In accordance with the present invention, a method for automated parameter measurement includes strategically positioning an identifier tag at a location proximate a first object. The identifier tag stores location-specific information associated with the first object. A sensor in communications with the identifier tag receives the location-specific information from the identifier tag. Additionally, the sensor is used to collect quantitative data associated with a first parameter from the first object. The location-specific information received from the first identifier tag is used to process the quantitative data.

25 Claims, 2 Drawing Sheets

SYSTEM AND METHOD FOR AUTOMATED PARAMETER MEASUREMENT

RELATED APPLICATION

This patent application claims priority from Patent Application Ser. No. 60/854,160, filed Oct. 26, 2006, entitled AUTOMATED PARAMETER MEASUREMENT.

TECHNICAL FIELD OF THE INVENTION

The present invention generally relates to automated parameter measurement, and more specifically relates to thermometers and other parameter sensing devices used to perform safety and quality checks in the food services industry.

BACKGROUND OF THE INVENTION

Today's manufacturing facilities are highly controlled and monitored. Typically, the raw material input is inventoried and tracked throughout the process. Certain steps of the manufacturing and assembly process may be electronically monitored so that variations exceeding a predetermined threshold can be flagged and corrected immediately. A growing concern in many industries today is the accurate measurement and recording of parameters that may be variable during the manufacturing process.

Parameters that may be monitored and recorded during the manufacturing process may relate to product safety, quality control, liability, and/or efficiency. For example, in the food services industry where the end result of the manufacturing and assembly process is a food product, various parameters relating to the food product may be monitored as the food product is prepared for human consumption. For example, one such parameter that may be carefully monitored for health and safety reasons is the temperature of the food product during cooking and post-cooking handling. The temperature of food products is critical to avoid serving food items that include bacteria associated with food borne illnesses. Additionally, the temperature of food products may be important in gourmet cooking where customers may specify a desired level of doneness.

Typically, kitchen staff is periodically required to measure the temperature of food products or their storage or holding areas to ensure product safety, extend product life, minimize spoilage, and reduce liability. For example, a measurement device such as a thermometer or thermistor- or thermocouple-based device may be inserted into a food item to measure the temperature of a food product. A display on the device then provides a reading of the measured parameter for notation by the kitchen staff. The collected results may be manually compared to a standardized guideline and then entered into a log for future audit or equipment adjustment.

The performance of these tasks is labor intensive and labor dependent. Staff must be adequately trained to use temperature and other parameter measuring equipment in a correct and consistent manner. Typically, the staff must configure and reconfigure the parameter measuring equipment based on the parameter being monitored and/or the type of food product being measured. For example, a single thermometer used for detecting the temperature of a variety of different meats must be reconfigured between readings based on the type of meat being measured. Additionally, staff must be relied upon for accurately remembering or looking up predetermined thresholds that must be met with respect to each type of food product. Staff must also be relied upon for accurately recording the resulting measurements.

This labor dependent process often results in the inaccurate monitoring of the food products. Often, overworked and under-motivated employees fail to accurately obtain and/or record the temperature readings and may even fail to take the temperature readings altogether. As a result, food may not meet guidelines established the U.S.D.A. or another regulating authority. Similar problems exist in processing plants, grocery stores, industrial applications, and other industries dependent on its staff for the monitoring of critical parameters.

SUMMARY OF THE INVENTION

In accordance with the present invention, a method for automated parameter measurement includes strategically positioning an identifier tag at a location proximate a first object. The identifier tag stores location-specific information associated with the first object. A sensor in communications with the identifier tag receives the location-specific information from the identifier tag. Additionally, the sensor is used to collect quantitative data associated with a first parameter from the first object. The location-specific information received from the first identifier tag is used to process the quantitative data.

A technical advantage of the present invention is the provision of location-based monitoring system for use in automated parameter measurement. In particular embodiments, the automatic parameter measurement system may be implemented for the monitoring of food products and other objects within the food services industry. Quantitative data may be gathered and compared with predetermined location-based thresholds so that exceptions can be noted, kitchen staff can be alerted, and kitchen equipment can be adjusted. Such derived quantitative values can be automatically compared against expected or normal thresholds or ranges for a particular type of food item. Another technical advantage may be that the sensor automatically receives and uses location-based information when the sensor is used in a predefined sensing zone. The location-based information may be used to identify the type of object being measured without user input. As a result, measurement gathering equipment is automatically configured and calibrated for the particular type of food product without user input.

Another technical advantage may be that appropriate responses to a breach of the predetermined threshold can be immediately and automatically carried out. As a result, equipment used in the processing of the food items may be automatically adjusted based on the parameter measurements obtained from the food products. For example, the temperature of an oven, storage container, conveyor broiler, refrigerator, or freezer may be adjusted when the temperature of the food product is outside a desirable range. Another technical advantage may be that the operation and efficiency of equipment may be closely monitored.

Still another technical advantage may be that the parameter measurement data obtained by a sensor may be automatically logged and stored in a database. The data may be stored locally and/or remotely. Local data storage enables a local manager to oversee the operations of the kitchen facilities and allows the local manager to observe the data summaries of the various equipment and be alerted when breaches are detected. Remote storage enables a regional manager to remotely oversee the operations of many kitchen facilities. The regional manager can observed data summaries of the various sites and be alerted when breaches are detected. In this manner, a technical advantage may be that the present invention virtually transports a regional manager to all the sites of his/her operations and facilities simultaneously, automatically monitors the operational data of each site and flags exceptions, and makes available the experience and knowledge of the regional manager to the staff at each site.

There maybe additional benefits derived from certain embodiments of the system and method of the present invention. In the food preparation industry, the proper manner in which the food is prepared (preparation temperature, moisture content, etc.) can be ensured and improved. Proper food preparation temperature is especially crucial for certain food stuffs, such as chicken, beef, pork and eggs, for example. Optimal operations in the area of parameter measurement would improve customer satisfaction, improve efficiency, increase return business, and increase revenues.

BRIEF DESCRIPTION OF THE DRAWINGS

For a better understanding of the present invention, reference may be made to the accompanying drawings, in which.

DETAILED DESCRIPTION OF THE INVENTION

Figure 1:
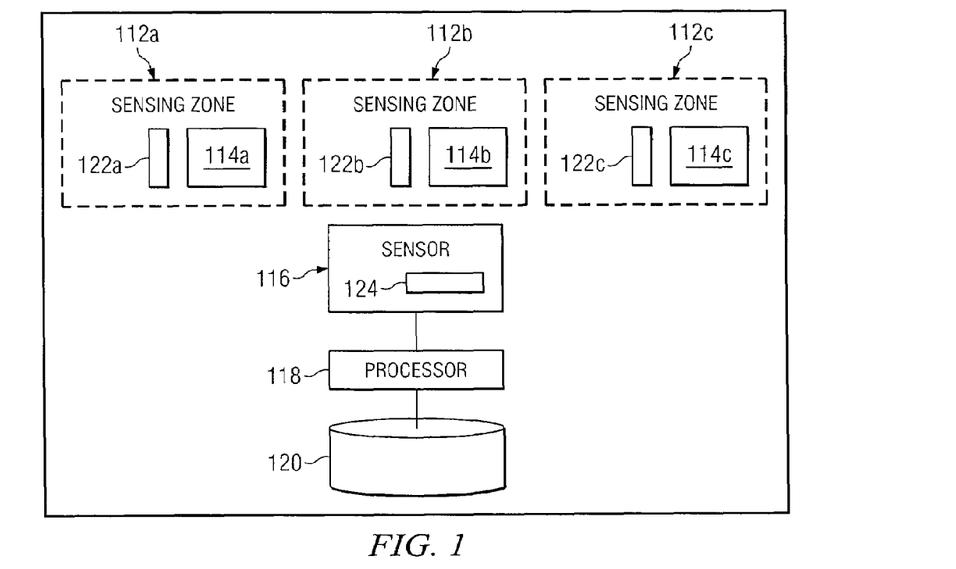
FIG. 1 is a block diagram of a system for automated parameter measurement, according to a particular embodiment of the present invention.

FIG. 1 is a block diagram of an embodiment of a system 10 for automated parameter measurement. System 100 includes multiple sensing zones 112 for the obtainment of quantitative data from one or more objects 114 within the sensing zones 112. The quantitative data may include measurement information related to any measurable parameter associated with an object 114. In particular embodiments, the quantitative data may be obtained using a sensor 116 that receives location-specific parameter measuring information from each sensing zone 112. Thus, when the sensor 116 is used within a particular sensing zone 112 to obtain quantitative data from an object 114 associated with that sensing zone 112, sensor 116 receives location-specific information from the sensing zone 112. As will be described in more detail below, such location-specific information may include location identification information, object identification information, measuring instructions, or any other data that may be relevant to and specific to a particular object 114. The quantitative data obtained by sensor 116 may then be communicated to a processor 118 that processes the quantitative data according to any measuring instructions applicable to the particular object 114. The quantitative data and any other useful information may be stored in a data storage 120 for future analysis and reporting.

Object 114 may include any object of which a measurable parameter may be monitored. For example, object 114 may include a raw material that is subject to monitoring during a manufacturing process. In one particular embodiment, object 114 includes a food item exhibiting various measurable characteristics during preparation. In another embodiment, object 114 may include a piece of equipment such as a holding container, an oven, a fryer, a refrigerator, a freezer, a conveyor griddle, or a griddle that is used during the preparation of food products. However, although system 100 may be particularly useful in the food services industry, it is generally recognized that object 114 may include any type of raw material, equipment, or other device for which constant or periodic monitoring is desired.

Parameters that may be measured and monitored may relate to product safety, quality control, liability, or efficiency. For example, in the food services industry example described above, where object 114 comprises a food product, various parameters related to the food product may be obtained and monitored during the preparation of the food product for human consumption. One such parameter that may be carefully monitored for safety reasons may include the temperature of the food product. Temperature may be monitored to avoid serving food items that include bacteria associated with food borne illnesses. Temperature may also be monitored during the preparation of gourmet or made-to-order food items where a recipe or a customer may specify a desired level of doneness. Other characteristics that may be similarly measured and monitored in the food services industry may include the moisture content of food item, the temperature of a piece of equipment used in the preparation of food items, the humidity level within the equipment, or any other measurable parameter.

Sensor 116 may be used to obtain quantitative data relating to a measurable parameter associated with object 114. As discussed above, in certain examples, the quantitative data may include data relating to the temperature of an object 114, the humidity level of an object 114, the moisture content of the object 114, or another measurable parameter. Thus, in particular embodiment, sensor 116 may include a remote monitoring and transmitting unit that is capable of monitoring one or more parameters being measured. For example, where the parameter being monitored is temperature, sensor 116 may include a thermometer, thermistor, or thermocouple-based device that is used to obtain internal temperature measurements of food products.

Figure 2:
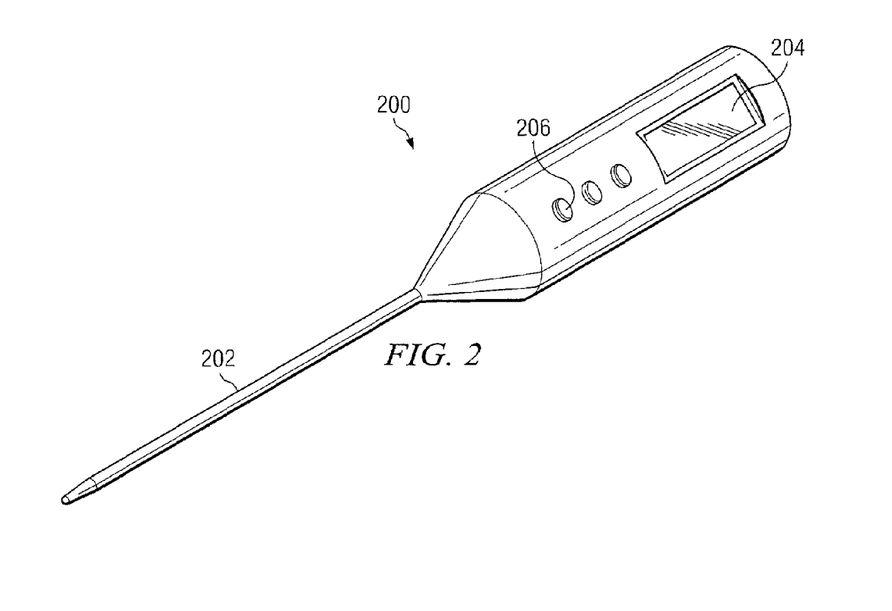
FIG. 2 is a schematic of a sensor for automated parameter measurement, according to a particular embodiment of the present invention.

FIG. 2 is a schematic of an embodiment of a sensor 200 for automated parameter measurement, according to a particular embodiment of the present invention. In the illustrated embodiment, sensor includes a thermometer having a probe 202 for inserting into or proximate object 114. For example, where object 114 comprises a food product such as a piece of meat, probe 202 is preferably inserted into the food product to obtain an internal measurement of temperature or other monitored parameter. Accordingly, probe 202 may be configured to facilitate the insertion of probe 202 into object 114. In particular embodiments, probe 202 may include a sharp tip for piercing a piece of meat or other food product.

As illustrated, sensor 200 includes one or more indicators for communicating information to a user of sensor 200. Specifically, sensor 200 as illustrated in FIG. 2 includes a liquid crystal display (LCD) indicator 204 and a light emitting diode (LED) indicator 206. Although two indicators are illustrated, however, it is recognized that sensor 200 may include more or fewer indicators where appropriate. Additionally, the type(s) of indicators may vary as required to display the information conveyed by the indicators.

In particular embodiments, indicators 204 and 206 may be used to convey quantitative data such as that discussed above. For example, where object 114 includes a food product and probe 202 is used to obtain an internal temperature measurement of the food product, LCD indicator 204 may use alphanumeric digits to convey the internal temperature reading obtained from the food product to the user.

Additionally or alternatively, indicators 204 and 206 may be used to convey qualitative data to the user. Specifically, and as will be described in more detail below, sensor 200 may communicate with one or more local or remote processors for the processing and analysis of a quantitative parameter measurement data obtained by sensor 200. In particular embodiments, the local or remote processor may analyze the quantitative data. For example, the quantitative data may be compared to a predefined threshold or to a set range to determine if the quantitative data is within a desirable range.

In particular embodiments, the local or remote processor may translate the data into qualitative data, and such qualitative data may be conveyed to a user of sensor 200 where desirable. Thus, in the example described above, where object 114 includes a food product and probe 202 is used to obtain an internal temperature measurement of that food product, sensor 200 may communicate the temperature measurement to a local or remote processor that then translates the temperature measurement into qualitative data. Alphanumeric digits may then be used to convey the qualitative data to a user of sensor 200. For example, where the processor determines that the temperature of object 114 exceeds a predetermined threshold or falls within a desired set range, a message such as "Good" may displayed on LCD indicator 204. It may be recognized that a plethora of other messages may also be conveyed using LCD indicator 204. Such messages may include but are not limited to "too hot," "too cold," "within range," "too humid," "too dry," and "too wet." Any appropriate message relating to the particular parameter being measured may be conveyed.

In particular embodiments, the quantitative or qualitative data may be additionally or alternatively represented using LED indicator 206. For example, LED indicator 206 may include one or more LED bulbs that are used to flash a light that identifies some qualitative characteristic to the user of sensor 200. For example, LED indicator 206 may light up when a temperature has been obtained thus indicating that sensor 200 has completed the automated parameter measurement. As another example, LED indicator 206 may light up to indicate that the obtained temperature reading is within a desired range or that the obtained temperature indicates that the food product has reached a desired level of doneness.

In FIG. 2, LED indicator 206 includes three LED bulbs. In particular embodiments, the three LED bulbs are of three different colors. Each color may convey a different message to the user. For example, a first color such as green may be used to indicate to the user that the measured parameter is within a desired set range, exceeds a predefined threshold, or is otherwise deemed "good." A second color such as yellow may identify to the user that the measured parameter is at a low or high end of the range and thus, while satisfactory, is close to being unsatisfactory. A third color such as red may indicate to the user that the measured parameter is outside the desired range, is below the predefined threshold, or is otherwise deemed "bad." Although the illustrated embodiment includes three LED bulbs, it is recognized that LED indicator 206 may include any desired number and colors of bulbs. LED indicator 206 may be used in any appropriate manner to convey any number of desired messages to the user. For example, an LED bulb may be used to identify to the user that sensor 200 has completed the measurement and has successfully obtained a parameter measurement. As further examples, an LED bulb may be used to identify to the user that the sensor 200 has malfunctioned and that parameter measurement has not been maintained.

As described above, sensor 200 may be used to obtain measurements from a plurality of different objects located within multiple sensing zones 112. For example, returning to FIG. 1, system 100 includes three sensing zones 112a-c. Each sensing zone 112 may be used in conjunction with a different type of object 114. Thus, in the food services example described above, assume that the three illustrated sensing zones 112a, 112b, and 112c correspond with a chicken zone, a hamburger zone, and a fish zone. For example, a first object 114b stored or handled in first sensing zone 112a may include a chicken breast. A second object 114b stored or handled in second sensing zone 112b may include a hamburger patty. A third object 114c stored or handled in third sensing zone 112c may include a fish patty. Despite these being three different types of meat, it is desirable that a single sensor 116 may be used to obtain parameter measurements from the three different types of objects 114.

For the automated obtainment and analysis of data from different distinct types of objects 114, sensor 116 receives location-specific parameter measuring information from each sensing zone 112. In a particular embodiment, each sensing zone 112 includes an identifier tag 122 that uniquely identifies the particular sensing zone 112 or a particular type of object 114 handled in the particular sensing zone 112. Thus, where first object 114a is a chicken breast, identifier tag 122a may be configured to transmit location-specific parameter measuring information that specifically relates to chicken. Alternatively, identifier tag 122a may be configured to transmit location-specific information that may be used to identify that object 114a is a piece of chicken. Conversely, where first objects 114b and 114c include a hamburger patty and a fish patty, respectively, identifier tags 122b and 122c are configured to transmit location-specific parameter measuring information that relates to hamburgers and fish, respectively.

When sensor 116 is used within a particular sensing zone 112, sensor 116 may receive the location-specific parameter measuring information transmitted by the tag identifier 122 of that sensing zone 112. In particular embodiments, such information may be transmitted from sensing zone 112 to sensor 116 using radio frequency technology. For example, identifier tags 122 may include radio frequency identification (RFID) tags. For receiving the radio frequency data, sensor 116 may include a transceiver 124 capable of reading or otherwise receiving the RFID information provided by sensing zone 112.

In a particular embodiment, the location-specific parameter measuring information includes a location identifier. Thus, each sensing zone 112 may be configured to transmit a unique location identifier to sensor 116 when sensor 116 is used in sensing zone 112a. For example, sensor 116 may receive information from sensing zone 112a that uniquely identifies to sensor 116 that sensor 116 is being used in sensing zone 112a. Sensor 116 may then use the location identifier to identify the type of object 114 stored in a particular sensing zone 112. Thus, in the example described above, sensor 116 used in sensing zone 112a may receive location specific information that enables sensor 116 to determine that object 114a is a piece of chicken.

In other particular embodiments, sensing zones 112 may transmit location-specific parameter measuring information that directly identifies to sensor 200 the type of object 114 stored or handled in the particular sensing zone 112. For example, sensing zone 112a may communicate a unique code or other piece of information to sensor 116 that indicates that object 114a is a chicken breast. Similarly, sensing zones 112b and 112c may communicate unique codes or other information that indicate that object 114b and object 114c include a hamburger patty and a fish patty, respectively.

Additionally or alternatively, the location-specific parameter measuring information communicated by a particular sensing zone 112 may include measuring instructions. The measuring instructions may include any information that relates specifically to the object 114 handled within the particular sensing zone 112. For example, the measuring instructions may include a temperature set range or a predefined threshold that is used by sensor 116 to determine that an object such as a piece of meat is safe for human consumption. Thus, in the above-described example, sensing zone 112a may transmit a temperature range that is specific to chicken. Sensing zones 112b and 112c may communicate similar information relating to hamburger patties and fish patties, respectively. Where sensing zones 112 communicate measuring information to sensor 116, the measuring instructions are not limited to acceptable temperature ranges, humidity ranges, moisture content ranges, or other ranges. Rather, the measuring instructions communicated by a sensing zone 112 may include any information that is particular to and related to the particular object 114 associated with that sensing zone 112.

A processor 118 receives the location-specific parameter measuring information and uses the location-specific parameter measuring information to analyze quantitative data obtained for a particular object 114. Although illustrated separately from sensor 116, it is recognized that, depending on the particular configuration of system 100, processor 118 may be a component of sensor 116 or may be remote from sensor 116.

In particular embodiments, processor 118 may use the location-specific parameter measuring information to translate quantitative data measured by sensor 116 into qualitative data. For example, when sensor 116 is used to determine the temperature of a piece of chicken, processor 118 may compare the measured temperature to a set range that is specific to chicken. If the measured temperature is within the identified set range, qualitative data may be generated to represent that the chicken is acceptable. Conversely, if the measured temperature is below the set range, qualitative data may be generated by processor 118 to represent that the chicken is of questionable quality. Additionally, where the measured temperature is above the set range, qualitative data may be generated by to represent that the chicken to be overcooked and, thus, also of questionable quality. In this manner, the quantitative parameter measurement obtained by sensor 116 may be converted to qualitative data by processor 118. The qualitative data may then be conveyed to the user via indicators 204 or 206. Additionally, where desired, processor 118 may operate to store the qualitative and quantitative data in data storage 120 for future analysis and reporting.

Figure 3:
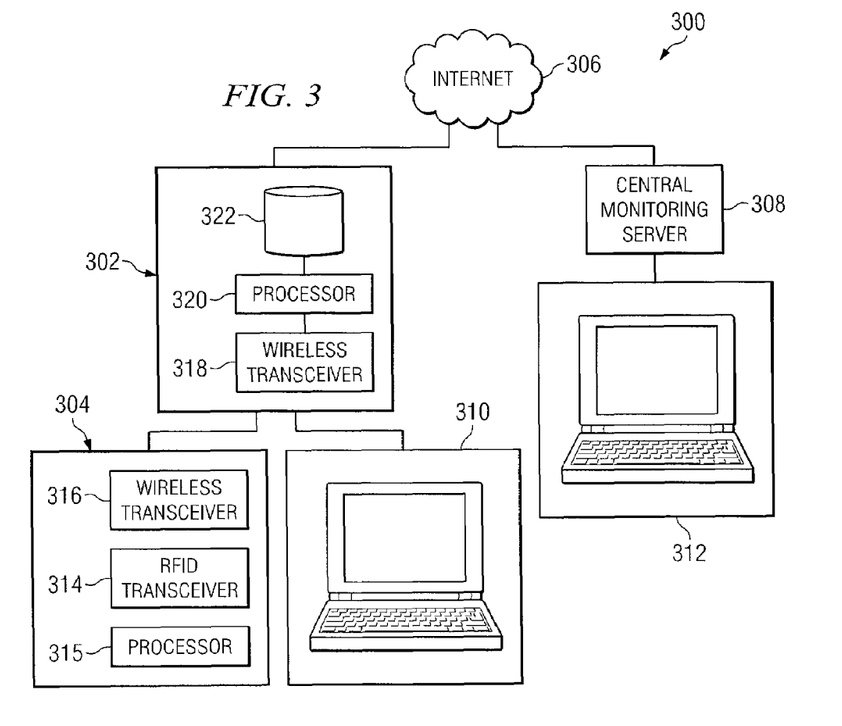
FIG. 3 is a block diagram of a network-based system for automated parameter measurement, according to a particular embodiment of the present invention.

FIG. 3 is a block diagram of a network-based system 300 for automated parameter measurement, according to a particular embodiment. Network-based system 300 includes a local data acquisition system 302 that receives parameter measurements and other location-specific data from a sensor 304. A network 306 is used to communicate the parameter measurement data to a central monitoring server 308. Client systems 310 and 312 provide user access to the parameter measurement data.

Network 306 represents communication equipment, including hardware and any appropriate controlling logic, for interconnecting local data acquisition system 302 and central monitoring server 308. In particular, network 306 may enable the communication of signals, data, and/or messages relating to parameter measurement data. In certain embodiments, network 306 may comprise all or a portion of a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate the described communication capabilities, communication network 306 may include routers, hubs, switches, gateways, call controllers, and/or any other suitable components in any suitable form or arrangement. Although communication network 306 is illustrated as a single network, communication network 306 may comprise any number or configuration of networks.

Sensor 304 may operate as was described above with respect to FIGS. 1 and 2. In a preferred embodiment, sensor 304 includes a radio frequency (RF) transceiver 314 for receiving location-specific measuring information from a sensing zone 112. Sensor 304 also includes a micro-processor 315. Micro-processor 315 enables sensor 304 to obtain parameter measurement data from an object 114. In a particular embodiment, micro-processor may also enable sensor 304 to perform some local processing of the parameter measurement data. For example, where a set range is obtained by or stored locally by micro-processor 315, processor 315 may compare a parameter measurement obtained from object 114 with the set range to determine locally if the object 114 is within the acceptable range. In particular embodiments, micro-processor 315 may also sends commands to indicators 204 and 206 to result in the appropriate information being conveyed to a user of sensor 304. For example, processor 315 may direct an appropriate LED to be lit when the micro-processor 315 determines that the obtained measurement is within the acceptable range.

In the illustrated embodiment, sensor 304 also communicates data to and receives data from a local data acquisition system 302. Thus, in the illustrated embodiment, sensor 304 includes a second transceiver 316 that is configured to communicate data to and receive data from a similarly configured transceiver 318 of local data acquisition system 302. In a preferred embodiment, transceiver 316 and transceiver 318 operate to transmit the data over a wireless network such as a Wireless Personal Area Network. For example, in a particular embodiment, transceivers 316 and 318 may operate under the ZigBee standard, which operates at a low data rate with little power consumption. The parameter measurement data may be transmitted in real time as the parameter measurement data is obtained or generated by sensor 304. Alternatively, where sensor 304 includes a data storage component (not shown), the parameter measurement data may be transmitted to local data acquisition system 302 on a periodic basis.

Local data acquisition system 302 includes a processor 320. In particular embodiments, processor 320 may operate to store set ranges for multiple objects 114 of differing types. Processor 320 may operate to transmit a set range to sensor 304 based on the location of sensor 304 in a particular sensing zone 112. Additionally, in some embodiments, processor 320 may operate to perform some analysis of parameter measurements obtained by sensor 304. Thus, it is recognized that processor 320 may perform any of the functionality described above with respect to automated parameter measurement.

In particular embodiments, processor 320 may also include an automation controller that operates to automatically adjust equipment in a sensing zone 112 based on parameter measurements obtained by sensor 304. For example, assume that a conveyor broiler is used to cook chicken and that a sensor 304 is used to obtain an internal temperature measurement of a piece of chicken on the conveyor in first sensing zone 112a. If the internal temperature of the chicken is too low, the chicken may be unsafe for human consumption. When such a determination is made, processor 320 may increase the temperature of the broiler to ensure that subsequent pieces of chicken are more fully cooked. Additionally or alternatively, the speed on the conveyor broiler may be decreased to result in subsequent pieces of chicken being cooked longer. In this manner, kitchen equipment may be adjusted in response to unsatisfactory readings on food products. Additionally, where object 114 is the piece of equipment and it is the equipment (rather than the product) that is being monitored, automation controller may operate similarly to adjust the equipment in response to unsatisfactory readings or breaches of the equipment.

In particular embodiments, processor 320 may also maintain a log in a database 322. As described above, when a parameter measurement is obtained by sensor 304, sensor 304 may transmit the parameter measurement to local data acquisition system 302. Processor 320 may time stamp the parameter measurement and store the stamped parameter measurement in the log with other parameter measurement entries. Processor 320 may analyze trends within the log to identify and diagnose equipment problems. A local manager may use a client system 310 to access the log. Processor 320 may provide reporting functionality that allows the local manager to run reports on various equipment used in the production or preparation of objects 114. For example, in the food services industry, a manager of a local restaurant may use client 310 to review the log. According, the manager may identify the number of instances during a specific time frame that the unacceptable parameter measurements were obtained. Additionally or alternatively, the manager may use the data to identify failing equipment and to make equipment changes.

Network 306 allows the data maintained and analyzed at local data acquisition system 302 to be accessed by a user of a remote client 312. In particular embodiments, remote client 312 includes a computer with a user interface, such as a graphical user interface or a web browser application for displaying data, including sensor measurements, images, video streams, audio streams, analysis data, data summary reports, and other information. Remote client 312 may be any computing platform or processor that is capable of accessing, processing, analyzing, and storing data.

Remote client 312 enables a user to remotely monitor disparate locations. For example, a district manager who supervises many restaurant locations may use remote client 312 to access the log in database 322 at each remote location. In particular embodiments, the data maintained at each local data acquisition system 302 may be transmitted via Internet 306 to central monitoring server 308 where it may be centrally stored. Where central monitoring server 308 receives such data from many disparately located local data acquisition systems 302, central monitoring server 308 may be consolidate the data from the different locations. The district manager may use the data received from local data acquisition systems 302 to identify inefficient or failing locations so that corrective actions may be taken.

Figure 4:
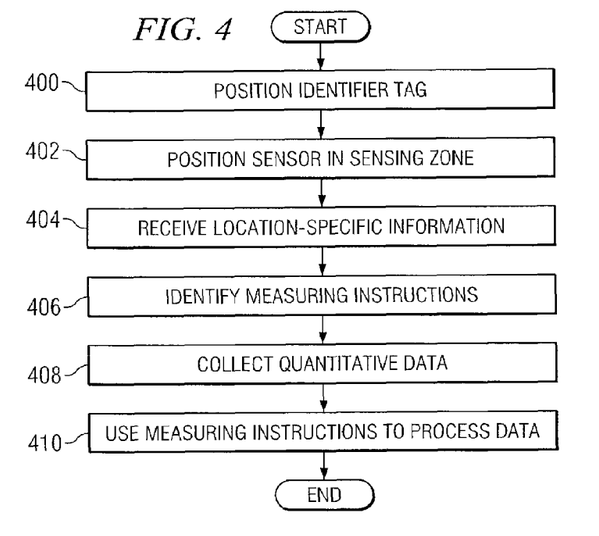
FIG. 4 is a flowchart of method for automated parameter measurement, according to a particular embodiment of the present invention.

FIG. 4 is a flowchart of a method for automated parameter measurement, according to a particular embodiment of the present invention. The method begins at step 400 when an identifier tag is strategically placed proximate an object 114 in a sensing zone 112a. In particular embodiments, the identifier tag 122 stores location-specific information that is associated with the object 114. For example, in the food services example discussed above, a sensing zone 112 may include any area of a commercial kitchen that is used for the handling of particular type of food product. Identifier tag 122 stores data related to the particular type of food product. For example, if the sensing zone 112 includes a conveyor broiler that is used to cook hamburger patties, identifier tag 122 may store identification information that can be used to identify that an object 114 located within sensing zone 112 is a hamburger patty.

At step 402, a sensor 304 is positioned proximate object 114 within the sensing zone 112. For example, if the sensing zone 112 includes a conveyor broiler that is used to cook hamburger patties, a probe portion 202 of sensor 304 may be inserted into a hamburger patty. In particular embodiments, the positioning of the sensor proximate object 114 may be in accordance with instructions given the staff to take a measurement. For example, the staff may be first alerted that a measurement is needed from an object 114. A staff member may then respond to the alert by inserting probe portion 202 into object 114.

In particular embodiments, sensor 304 may be configured to automatically begin the obtainment of a parameter measurement when the sensor 304 is inserted into the hamburger patty. For example, sensor 304 may be configured to initiate measurement when the probe 202 senses a rapid change in temperature that results from the sensor 304 being inserted into the hamburger patty. In particular embodiments, an indicator 206 or 204 of sensor 304 may flash to identify to a user of sensor 304 that the sensor 304 is operating and to confirm that the automated parameter measurement process has started. For example, one or more LEDs on sensor 304 may flash an appropriate color.

At step 404, sensor 304 receives the location-specific information from identifier tag 122. As described above, the location-specific information includes any information related to the measurement of a parameter and is unique to sensing zone 112 and the type of object 114 in sensing zone 112. For example, the location-specific information may include a location identifier or an object identifier.

In a particular embodiment, the location-specific information is transmitted from the sensor 304 to a processor 320 of a local data acquisition system 302. Based on the location identifier or object identifier, processor 320 identifies measuring instructions associated with the object 114 at step 406. For example, processor 320 may identify an appropriate set range for the particular type of object 114 associated with the sensing zone 112. More specifically, where object 114 is a food product such as a piece of chicken and the measured parameter is an internal temperature, processor 320 may identify an acceptable set range of temperatures or a predefined threshold or the boundary limits to which a parameter measurement should be compared. Any measuring instructions identified by processor 320 may be transmitted back to sensor 304.

At step 408, sensor 304 is used to collect quantitative data from object 114. For example, in the food services example, sensor 304 may be used to obtain an internal temperature reading of a food product. Sensor 304 may then process the quantitative data obtained from the food product at step 410. In particular embodiments, the measuring instructions identified in step 406 may be applied to the quantitative data. For example, where the quantitative data is an internal temperature measurement, the data may be compared to the upper and lower bounds of an acceptable range of temperatures to determine if the measurement obtained by sensor 304 is between the upper and lower bounds. If the internal temperature measurement is deemed by sensor 304 to be satisfactory, an indicator 206 or 204 on sensor 304 may be used to indicate this fact to the user of sensor 304. For example, where sensor 304 includes an LED indicator 206, an appropriately colored LED may glow or flash to indicate to the user that the temperature of the object is acceptable. By contrast, if the temperature is unsatisfactorily low, an LED of a differing color may glow or flash to indicate to the user that the temperature of the object is unacceptable. If the temperature is unsatisfactorily high, an LED of still another color may glow or flash to indicate to the user that the equipment may be overcooking the food products. For example, an LED may be lit to identify to the user that the speed of the conveyor broiler may be increased to cook the food product less as it travels through the sensing zone 112.

After the appropriate message is conveyed to the user, the probe may be pulled from the food product. Sensor 304 may then be used to obtain a similar measurement from a different food product within the same sensing zone 112 or within a different sensing zone 112. Because sensor 304 is configured to receive location-specific information from each sensing zone 112 and automatically identify the type of object 114, sensor 304 may be used to obtain measurements for different types of food products without requiring user input between readings.

Furthermore, in certain embodiments, responses to breaches can be immediately and automatically carried out to remedy the breach. For example, equipment used in the processing of the food items may be automatically adjusted based on the parameter measurements obtained from the food products or based on the parameter measurements obtained from the equipment itself. For example, the temperature of an oven, storage container, conveyor broiler, refrigerator, or freezer may be adjusted when the temperature of the food product is outside a desirable range.

Certain embodiments also ensure that the parameter measurement data obtained by a sensor is automatically logged and stored in a database. Local data storage may enable a local manager to oversee the operations of the kitchen facilities and allow the local manager to observe the data summaries. Remote storage may enable a regional manager to remotely oversee the operations of many kitchen facilities. Accordingly, certain embodiments virtually transport a regional manager to all the sites of his operations and facilities simultaneously.

There maybe additional benefits derived from certain embodiments of the system and method of the present invention. In the food preparation industry, the proper manner in which the food is prepared (preparation temperature, moisture content, etc.) can be ensured and improved. Proper food preparation temperature is especially crucial for certain food stuffs, such as chicken, beef, pork and eggs, for example. Optimal operations in the area of parameter measurement would improve customer satisfaction, improve efficiency, increase return business, and increase revenues.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method for automated parameter measurement, comprising:
maintaining a first sensing zone in which a first food product is handled;
strategically positioning a first identifier tag storing location-specific information associated with the first food product in the first sensing zone;
maintaining a second sensing zone in which a second food product is handled, the second food product of a different type than the first food product;
strategically positioning a second identifier tag storing location-specific information associated with the second food product in the second sensing zone;
using a sensor to collect an internal temperature measurement from the first food product while the first food product is in the first sensing zone;
receiving, at the sensor, the location-specific information from the first identifier tag of the first sensing zone;
using the location-specific information received from the first identifier tag to identify, to the sensor, a first set range associated with a type of the first food product; and
using the sensor to compare the internal temperature measurement to the first set range to determine if the internal temperature measurement is within an acceptable range;
using said sensor to collect a second internal temperature measurement from the second food product while the second food product is in the second sensing zone;
receiving, at the sensor, the location-specific information from the second identifier tag of the second sensing zone;
using the location-specific information received from the second identifier tag to identify, to the sensor, a second set range associated with a type of the second food product, the second set range different from the first set range; and
using the sensor to compare the second internal temperature measurement to the second set range to determine if the second internal temperature measurement is within an acceptable range.

2. A method for automated parameter measurement, comprising:
maintaining a plurality of sensing zones associated with a plurality of objects, each of the plurality of sensing zones associated with a unique type of object;
strategically positioning, within each of the plurality of sensing zones, an identifier tag at a location proximate an object in a particular sensing zone, each identifier tag storing location-specific information unique to the unique type of object in the particular sensing zone;
receiving, at a sensor in communications with a first identifier tag in a first sensing zone associated with a first object, the location-specific information from the first identifier tag;
using the sensor to collect quantitative data associated with a first parameter from the first object; and
using the location-specific information received from the first identifier tag to identify the unique type of the first object in the first sensing zone and process the quantitative data based on the unique type of the first object.

3. The method of claim 2, wherein strategically positioning the first identifier tag comprises placing a radio frequency identifier (RFID) tag proximate the first object, and wherein the location-specific information is received, at a radio frequency (RF) transceiver of the sensor.

4. The method of claim 2, wherein:
receiving the location-specific information from the first identifier tag comprises receiving at least one of a location identifier and an object identifier; and
processing the quantitative data comprises using the at least one of the location identifier and the object identifier to identify a rule associated with on the unique type of the first object and apply the rule to the quantitative data.

5. The method of claim 2, wherein:
receiving the location-specific information from the first identifier tag comprises receiving a set range having a first bound and a second bound; and processing the quantitative data comprises determining if the quantitative data is between the first bound and the second bound.

6. The method of claim 2, wherein using the sensor to collect quantitative data comprises using the sensor to obtain a parameter measurement selected from the group consisting of a temperature measurement, a moisture content, and a humidity measurement.

7. The method of claim 2, further comprising:
receiving, at the sensor, the location-specific information from the first identifier tag when the sensor is disposed within a boundary of a first sensing zone in which the first object is located; and
receiving, at the sensor, additional location-specific information from a second identifier tag when the sensor is disposed within a boundary of a second sensing zone in which a second object is located.

8. The method of claim 2, wherein using the sensor to collect quantitative data comprises using the sensor to obtain a temperature measurement of a piece of equipment, and wherein the method further comprises automatically adjusting a parameter of the piece of equipment in response to determining the temperature measurement of the piece of equipment.

9. The method of claim 2, further comprising communicating the quantitative data to a client device via the Internet, the client device located at a location remote from the processor and sensor.

10. The method of claim 2, wherein processing the quantitative data comprises translating the quantitative data into qualitative data.

11. The method of claim 10, further comprising causing an indicator on the sensor to display at least one of the quantitative data and the qualitative data to a user of the sensor.

12. The method of claim 11, wherein causing the indicator on the sensor to display the at least one of the quantitative data and the qualitative data to the user of the sensor comprises at least one of causing an light emitting diode (LED) to be lit and causing a message to be displayed on a liquid crystal display (LCD).

13. A method for automated parameter measurement, comprising:
strategically positioning an identifier tag at a location proximate a first object, the identifier tag storing location-specific information associated with the first object;
receiving, at a sensor in communications with the identifier tag, the location-specific information from the identifier tag;
using the sensor to collect quantitative data associated with a first parameter from the first object; and
using the location-specific information received from the first identifier tag to process the quantitative data,
wherein using the sensor to collect quantitative data comprises using the sensor to obtain an internal temperature measurement of a food product, and wherein the method further comprises automatically adjusting a parameter of a piece of equipment in response to determining the internal temperature measurement of the food product.

14. A system for automated parameter measurement, comprising:
a plurality of sensing zones associated with a plurality of objects, each of the plurality of sensing zones associated with a unique type of object;
a plurality of identifier tags, each identifier tag strategically located proximate an object in a particular sensing zone, each identifier tag operable to store location-specific information unique to the unique type of object in the particular sensing zone;
a sensor in communications with the plurality of identifier tags, the sensor operable to:
receive the location-specific information from a first identifier tag in a first sensing zone associated with a first object; and
collect quantitative data associated with a first parameter from the first object; and
a processor in communications with the sensor, the processor operable to:
receive the quantitative data associated with the first parameter; and
use the location-specific information received from the first identifier tag to identify the unique type of the object in the first sensing zone and process the quantitative data based on the unique type of the first object.

15. The system of claim 14, wherein:
the first identifier tag comprises a RFID tag; and
the sensor comprises a RF transceiver operable to receive the location-specific information.

16. The system of claim 14, wherein:
the location-specific information comprises a location identifier or an object identifier; and
the processor is operable to use the location identifier or the object identifier to identify a rule associated with on the unique type of the first object and apply the rule to the quantitative data.

17. The system of claim 14, wherein the location-specific information comprises a set range having a first bound and a second bound, and wherein processing the quantitative data comprises determining if the quantitative data is between the first bound and the second bound.

18. The system of claim 14, wherein the quantitative data is selected from the group consisting of a temperature measurement, a moisture content, and a humidity measurement.

19. The system of claim 14, wherein:
the sensor is operable to receive the location-specific information from the first identifier tag when the sensor is disposed within a boundary of a first sensing zone in which the first object is located; and
the sensor is operable to receive additional location-specific information from a second identifier tag when the sensor is disposed within a boundary of a second sensing zone in which a second object is located.

20. The system of claim 14, wherein:
the first object comprises a food product;
the quantitative data associated with the first parameter comprises an internal temperature measurement of the food product; and
the system further comprises an automation controller operable to adjust a parameter of a piece of equipment in response to determining the internal temperature measurement of the food product.

21. The system of claim 14, wherein:
the first object comprises a piece of equipment;
the quantitative data associated with the first parameter comprises a temperature measurement of the piece of equipment; and
the system further comprises an automation controller operable to adjust a parameter of a piece of equipment in response to determining the temperature measurement of the piece of equipment.

22. The system of claim 14, further comprising a client device operable to access the quantitative data and display the quantitative data to a user of the client device.

23. The system of claim 22, wherein the client device is in communications with the processor via the Internet, the client device located at a location remote from the processor and sensor.

24. The system of claim 14, wherein the processor is operable to use the location-specific information to translate the quantitative data into qualitative data.

25. The system of claim 24, wherein the sensor further comprises an indicator operable to display at least one of the quantitative data and the qualitative data to a user of the sensor, the indicator selected from the group consisting of a light emitting diode (LED) and a liquid crystal display (LCD).

* * * * *